Patented July 18, 1939

2,166,544

UNITED STATES PATENT OFFICE 2,166,544

CONVERSION OF HYDROCARBONS

Thomas Cross, Jr., Baton Rouge, La., assignor to Standard Oil Development Company, a corporation of Delaware No Drawing. Application December 17, 1935, Serial No. 54,961

3 Claims. (Cl. 196—50)

The present application relates to the production of motor fuel of improved octane number, and is specifically directed to a catalytic process for reforming naphtha whereby improvements in octane number can be achieved with a minimum gas loss.

It is known that the octane number of naphtha, particularly straight run naphtha, can be improved by subjecting the naphtha to high temperature treatments, the purpose of which is to increase the content of light ends in the naphtha and/or rearrange the molecular structure of some of the constituents of the naphtha. In processes of the latter type the naphtha is usually conducted in the vapor phase over a dehydrogenation catalyst at atmospheric, slightly elevated or reduced pressure at a temperature between 1000 and 1150° F. While this treatment does improve the octane number of the naphtha, it causes the production of relatively large volumes of gas which consist, to a very substantial extent, of hydrogen and fixed gases of the olefinic and paraffinic type. The extent of this gas loss appears to bear a linear relation to the degree of improvement in octane number up to an improvement to about 70 from a stock having an initial octane number below 70, after which the gas loss rises steeply for each increment in octane number.

It has now been discovered that certain activated aluminous materials influence the reformation of naphthas in a remarkable manner. These materials make possible the reformation of naphtha at lower temperatures than those permissible for reformation with dehydrogenation catalysts of the usual type, with much lower gas losses, particularly when the desired final octane number of the naphtha is not too high, that is, is not over 70. In addition, when these materials are employed as contact agents, the low molecular hydrocarbons split off from the naphtha contain large percentages of butanes and relatively small amounts of hydrogen, normally gaseous paraffins and olefins. In short, these activated aluminous materials appear to exercise a fairly positive control over the point at which splitting of the initial hydrocarbons occurs.

A very suitable activated aluminous material for use according to the present invention is the activated alumina described in Patent No. 1,985,204. According to this patent, the activated alumina is prepared by calcining aluminum hydrate at a temperature between 300 and 800° C., preferably at about 350° C. The calcination of aluminum hydrate causes a partial dehydration and results in a highly adsorptive or absorptive product. The aluminum hydrate is preferably alumina scale deposited from sodium aluminate solutions in the form of scale in the aluminum precipitating tanks employed in the well known Fickes-Sherwin modification of the Bayer process, in which aluminum oxide is precipitated from sodium aluminate. The term "activated alumina" as herein employed, is here defined to mean calcined alumina produced by calcining aluminum hydrate at temperatures from 300 to 800° C. and to no other materials. Another especially desirable activated aluminous material for use in the present invention is a clay known as Marsil clay activated according to the process described in French Patent 760,646 published February 27, 1934. This clay contains from 5 to 17% of alumina. Activated alumina contains 91.23% alumina. The content of alumina is not, however, determinative of the utility of the aluminous material for the present invention since Attapulgus clay containing 16.5% of alumina, Terrana containing 54% of alumina and pumice stone, containing a large percentage of alumina in combination with silica, have been found to be unsuitable for use in the process of the present invention.

According to the present invention a naphtha is passed in the vapor phase over the activated aluminous material at a temperature between 900° and 1050° F., preferably at about 980° F.

The greatest benefit is derived from the present invention when the improvement desired in the octane number of the naphtha is only moderate. In such cases the desired improvement can be obtained by contact with the activated aluminous material with a far smaller gas loss than that incurred for the same octane number improvement when other contact agents are employed.

As an illustration of the difference in effect between an activated aluminous material and an unactivated aluminous material, the following results of two experiments are offered: A heavy naphtha derived from a crude originating in West Texas and having an octane number of 47 C. F. R. was passed at a temperature maintained substantially constant at 1050° F. over untreated Attapulgus clay, the feed rate being between 350 and 500 cc. of naphtha per 340 cc. of clay per hour. The gas obtained had a density of 0.52 and the gas loss amounted to 4.15% by weight. The octane number of the product was 55 C. F. R.

The same initial material was passed over activated alumina at a temperature of 950° F. and at substantially the same rate of flow. The gas given off had a density of 0.785 and the gas loss amounted to 1.2% by weight of the initial material. The octane number of the product obtained was 57.5. The same initial material was passed over Marsil clay at a temperature of 1000° F. and at substantially the same feed rate. The gas recovered had a density of 0.725 and the gas loss was 2.5% by weight. The octane number of the product obtained was 55.5.

In comparing the effect of the activated aluminous material with a dehydrogenation catalyst, a West Texas heavy naphtha having a C. F. R.—MM octane number of 41.5 was used as the initial material. Activated alumina was employed in the first run and a catalyst composed of the oxides of chromium, zinc and lead deposited on magnesite was employed as the catalyst in the second run. In each run the feed rate was the same. In the first run at 970° F. a gas loss of 6.3 was incurred and in the second run at 1060° F. a gas loss of 6.15 was incurred. The product in the first run had an octane number of 65.5. The product of the second run had an octane number of 63.5. One cc. of lead increased the octane number of the first product to 74.5 and the octane number of the second product to 70.3. Two cc. of lead increased the octane number of the first product to 77.2 and the octane number of the second product to 73.7. The sulfur content of the first product was 0.037 and that of the second product was 0.079. In a bomb breakdown test both products broke down in 18 minutes. The addition of 10 milligrams of alpha-naphthol per 100 cc. to the first product increased the breakdown time to 72 minutes. The same addition to the second product increased the breakdown time to only 24 minutes.

In order to illustrate that the effect of the activated aluminous material was more than that of a medium for causing turbulence, several runs were conducted in which a West Texas heavy naphtha having an octane number of 47 was passed at the same feed rate over activated alumina, pumice and iron jack chain respectively. In one run over activated alumina at 1000° F. the conversion was carried to a 3.65% gas loss and yielded a product having an octane number of 63.5. In duplicating this octane number increase over pumice a gas loss of 6.15 was incurred, and a temperature of 1080° F. was required. The same octane number increase was obtained over iron jack chain with a gas loss of 6.85% and only at a temperature of 1090° F. In obtaining an improvement in the octane number of the West Texas heavy naphtha to 63.5 with a dehydrogenation catalyst of the type described above, the gas loss incurred was 4.7%.

In a run over pumice at 1075° F., in which the conversion was carried to a 9.4% gas loss, the octane number was increased to 65 at a feed rate of 115 cc./hr. In a second run over activated alumina at 1040° F., in which the conversion was carried to an 8.5% gas loss, the octane number was increased to 71 with a feed rate of 210 cc./hr. In a similar run over Marsil clay at 1040° F., the octane number was increased to 66 with a gas loss of 5.5% with a feed rate of 300 cc./hr.

When the conversion was conducted in the presence of activated alumina to a gas loss of only 1.2% the octane number was increased to 57.5. With a gas loss of only 1.5% over Marsil clay the octane number of the product obtained was 59.5. A conversion to a similar gas loss over pumice stone made no measurable difference in the octane number. It was found to be very difficult to restrict the gas loss over pumice stone to such a small value, since with this material there appeared to be no middle course between a conversion to a high gas loss and no conversion at all. When Attapulgus clay was used as the contact material at a temperature of about 1050° F., or slightly higher, the gas loss incurred was 6.4% and the octane number of the reformed West Texas naphtha was 57, or below that obtained at a gas loss slightly above 1% with the activated aluminous material.

In the above examples the rate of feed of naphtha indicates liquid measure. Heat may be supplied to the reaction in any conventional manner. The reaction tube may be immersed in a bath of molten metal or imbedded in a metal block, such as a bronze block, heated electrically. For preheating the naphtha a conventional coil heater is employed.

In the specification and claims where reference is made to "v/v/hr." it is to be understood that this has reference to the units of volume of the feed stock per unit of volume of the catalyst passing thru the reactor per hour.

The nature and objects of the present invention having been described and specific illustrations of the character of the improvement effected thereby having been given, what is claimed as new and useful and desired to be secured by Letters Patent is:

1. A process for improving the octane number of a heavy naphtha which comprises subjecting said naphtha in the vapor state at a temperature between about 900 and about 1050° F. to the action of an activated Marsil clay.

2. A process as in claim 1 wherein the activated Marsil clay contains between about 5 and about 17% activated alumina.

3. A process for increasing the octane number of a naphtha, which comprises subjecting said naphtha in the vapor state at a temperature between about 900 and about 1050° F. to the action of an activated Marsil clay at a thruput of between about 0.88 v. and about 1.47 v/v/hr. measured while liquid.

THOMAS CROSS, JR.